(12) United States Patent
Fu et al.

(10) Patent No.: US 9,126,699 B1
(45) Date of Patent: Sep. 8, 2015

(54) PORTABLE CIRCULAR SYNTHETIC RUNWAY

(71) Applicants: Eric R Fu, San Jose, CA (US); Lillian R Fu, San Jose, CA (US)

(72) Inventors: Eric R Fu, San Jose, CA (US); Lillian R Fu, San Jose, CA (US)

( * ) Notice: Subject to any disclaimer, the term of this patent is extended or adjusted under 35 U.S.C. 154(b) by 0 days.

(21) Appl. No.: 14/721,882

(22) Filed: May 26, 2015

(51) Int. Cl.
*B64F 1/00* (2006.01)
*B64F 1/22* (2006.01)
*B64F 1/04* (2006.01)

(52) U.S. Cl.
CPC .... *B64F 1/22* (2013.01); *B64F 1/04* (2013.01)

(58) Field of Classification Search
CPC ............... B64F 1/06; B64F 1/08; B64F 1/14; B64F 1/22
USPC ........................ 244/110 F, 110 G, 114, 115
See application file for complete search history.

(56) References Cited

U.S. PATENT DOCUMENTS

| | | | |
|---|---|---|---|
| 1,748,663 A * | 2/1930 | Tucker | 244/63 |
| 3,989,206 A | 11/1976 | Gregory | |
| 8,028,952 B2 | 10/2011 | Urnes, Sr. | |
| 8,162,256 B2 * | 4/2012 | Goossen et al. | 244/110 E |
| 8,453,966 B2 * | 6/2013 | McGeer et al. | 244/110 F |

* cited by examiner

*Primary Examiner* — Tien Dinh
*Assistant Examiner* — Aaron Rodziwicz
(74) *Attorney, Agent, or Firm* — Grant's Law Firm; Allan Grant

(57) ABSTRACT

Presented is a system to launch, carry and recover aerial vehicles with a portal circular synthetic runway formed by a moving pad which is equivalent to flying carpet in the ancient tale. Based on the fact that during the process of takeoff, landing or being carried, an aircraft only needs be supported from limited space directly underneath (or above) it, a pad (or a beam or a cable), which is acting as carriage and moving in unison with an aircraft, can be used to provide the same structural support as what's rendered by conventional runway or transportation vehicle. Circular structure of the synthetic runway makes such a device compact and portable.

20 Claims, 6 Drawing Sheets

PORTABLE CIRCULAR SYNTHETIC RUNWAY

CROSS-REFERENCE TO RELATED APPLICATIONS

None.

TECHNICAL FIELD

This invention generally relates to runway for aircrafts to takeoff and land, and specifically provides a system and method to construct flying carpet like circular synthetic runway, which is small and light weight therefore portable.

BACKGROUND OF THE INVENTION

The basic concept of launching an aircraft by attaching it to a structure which revolves about a fixed axis and subsequently releasing it from the structure is well known in the art.

In civilian space, due to population growth, urban sprawl, etc., many airports disappeared, and available land which is suitable for commercial and recreational (e.g., radio controlled model airplanes) runway becomes less and less. In military space, battlefields are dynamic and fluid, and there are often cases that nearby airfields are desirable but not practical or feasible.

Previously, some exemplary ways to launch and recover unmanned aerial vehicles (UAV) are: throwing light-weight UAV by hand to launch it and landing it on its underbelly; Launching UAV by catapult and recovering it by net. Obviously larger and heavier UAV cannot be launched by hand. There are risks with catching UAV by net: UAV might be damaged during impact with net; UAV might fall to ground in case that it gets out of grip of net.

The present invention is inspired by folk tale Flying Carpet (also called Magic Carpet) from One Thousand and One Nights. While flying carpet was used to transport people in the tale, the invention here devises a flying carpet like device for takeoff, landing and general carrying purpose. Such a moving device forms a portable synthetic runway.

In the Thomas J. Gregory patent, U.S. Pat. No. 3,989,206, the invention provides a method and apparatus for launching a remotely piloted aircraft is disclosed wherein the aircraft, is revolved about a fixed pivot point until a pretermined speed is reached whereupon the vehicle is released from the launching apparatus. The vehicle is attached to one end of a rotatable arm, the imbalance on the arm being counteracted by a counter weight attached to the opposite end. The counter weight is released from the arm at the same time as the aircraft so as to avoid structural damage to the apparatus caused by rotation in the unbalanced condition. The arm is oriented such that it rotates in a plane inclined obliquely to the local gravitational field of the launch site. The supporting structure for the arm may be made stationary, or may be attached to a mobile vehicle for ground transportation.

U.S. Pat. No. 8,028,952 B2 issued on Oct. 4, 2011 to James M. Urnes, Sr. disclosed a system to launch and recover an UAV aircraft has a pole member attached to a deck of a ship. An arm member is attached to the pole member and extends away from the pole member in an approximately horizontal direction. The arm member is able to move rotationally and vertically on the pole member. An attachment mechanism is attached to a distal end of the arm member for holding and capturing the UAV aircraft. Momentum of the UAV aircraft causes the arm member to move rotationally around and vertically on the pole member when the UAV aircraft is coupled to the attachment mechanism.

U.S. Pat. No. 3,989,206 fails to at least teach or suggest how to land a flying vehicle using the same device or set of apparatus. Furthermore, it has a launching step that requires releasing counterweight at the same time when aircraft is released.

U.S. Pat. No. 8,028,952 B2 does not have a built-in balancing mechanism, instead it relies on weight of the ship to counter the imbalance caused by rotating UAV, therefore it's not portable. Furthermore, it does not provide means for UAV to land on conventional wheels.

The present invention is capable of both launching and landing aircraft, and is portable since the system can be easily setup when it's moved to a new location. Also the present invention does not require throwing away counterweight, thus poses no hazard associated with fast moving counterweight. Both taking off and landing on conventional wheels, and taking off and landing by hooking to top of aircraft are supported. There are also several other utilities built in the present invention to facilitate aircraft to take off and land. There are mechanisms to extend rotation radius to reduce path curvature to make it easier for the landing aircraft to follow the landing path. There are wings attached to the landing pads to generate lift to help support weight of aircrafts and maintain dynamic balance of the system. The present invention is also capable of launching and recovering 2 aircrafts simultaneously and none of these references presented this capability. This capability can be very useful in urgent battle field situations. Thus the present invention is seen to patentably distinguish over each of these references alone or in combination.

SUMMARY OF THE INVENTION

The invention as claimed has utility in that it provides a device and method to construct portable synthetic runway and landing pad.

It is an objective of this invention to provide a device that provides a convenient way to launch and recover of aerial vehicles, especially unmanned aerial vehicles (UAV).

It is an objective of this invention to provide a device that provides a portable way to launch and recover of aerial vehicles, especially unmanned aerial vehicles (UAV).

It is also an objective of this invention to provide a device that is versatile due to its portability when compared to conventional runways.

In accordance with the exemplary embodiments thereof described herein, the present invention provides a device and method to construct a portable circular synthetic runway formed by a moving pad which is equivalent to a flying carpet in the ancient tale.

Based on the fact that during the process of takeoff, landing or being carried, an aircraft only needs be supported from limited space directly underneath (or above) it, a pad (or a beam or a cable), which is acting as carriage and moving in unison with an aircraft, can be used to provide the same structural support as what's rendered by conventional runway or transportation vehicle.

It is a further objective to provide a launching structure which launches the aircraft while at the same time provides easy access to the aircraft for servicing and maintenance.

It is an objective of this invention to provide a device and method to construct a portable circular synthetic runway and landing pad formed by a carriage.

It is an objective of this invention to provide a device and method to construct a portable circular synthetic runway and landing pad having indicia thereon, so the pilots can stylize each device for any work or social environment.

It is an objective of this invention to create a device and method to construct portable circular synthetic runway and landing pad that is easy to manufacture, reliable in operation, and relatively inexpensive to produce.

In addition to the above objects, various other objects of this invention will be apparent from careful reading of this specification including the detailed description contained herein below.

BRIEF DESCRIPTION OF THE DRAWINGS

These as well as other features of the present invention will become more apparent upon reference to the accompanying drawings wherein like numerals designate corresponding parts in the several figures summarized as follows.

Other features and advantages of the invention will become apparent from the following detailed description, taken in conjunction with the accompany drawings, which illustrate, by way of example, various features of the invention.

DETAILED DESCRIPTION

The following detailed description and accompanying drawings are provided for purposes of illustrating and describing presently preferred embodiments of the present invention and are not intended to limit the scope of the invention in anyway. It will be understood that various changes in the details, materials, arrangements of parts or operational conditions which have been herein described and illustrated in order to explain the nature of the invention may be made by those skilled in the art within the principles and the scope of the invention.

Figure 1:
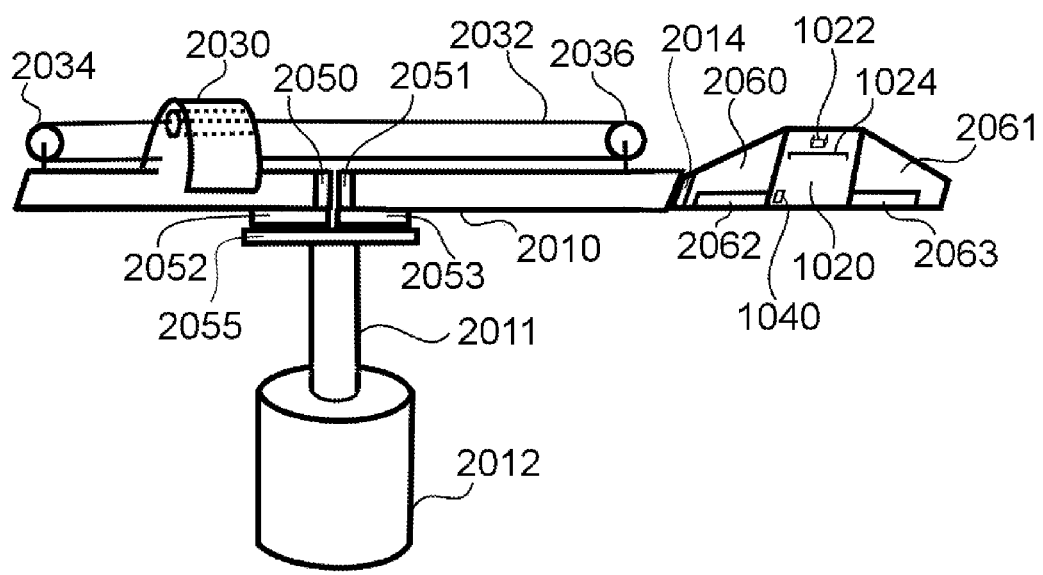
FIG. 1 is a perspective view of one embodiment of the invention, showing a first tilt pad connected to a rotating arm.
Figure 2A:
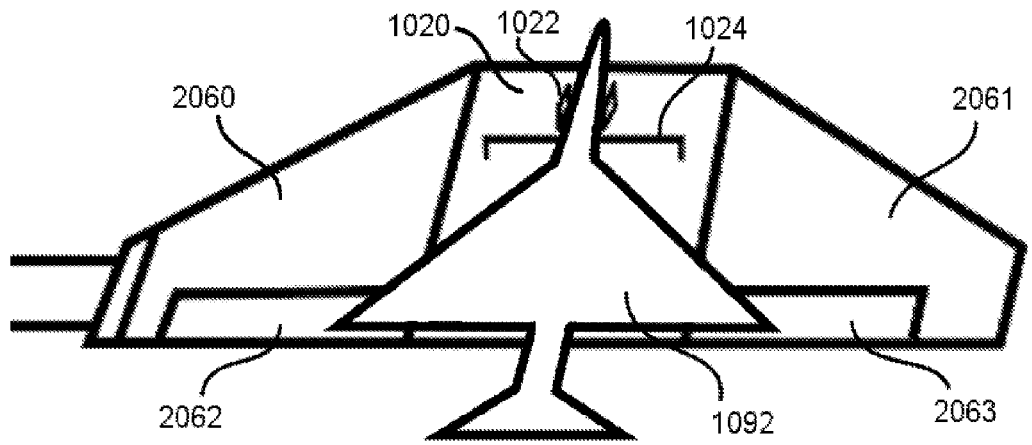
FIG. 2A is a perspective view of the preferred embodiment of the invention, showing the tilt pad and an aircraft attached.
Figure 2B:
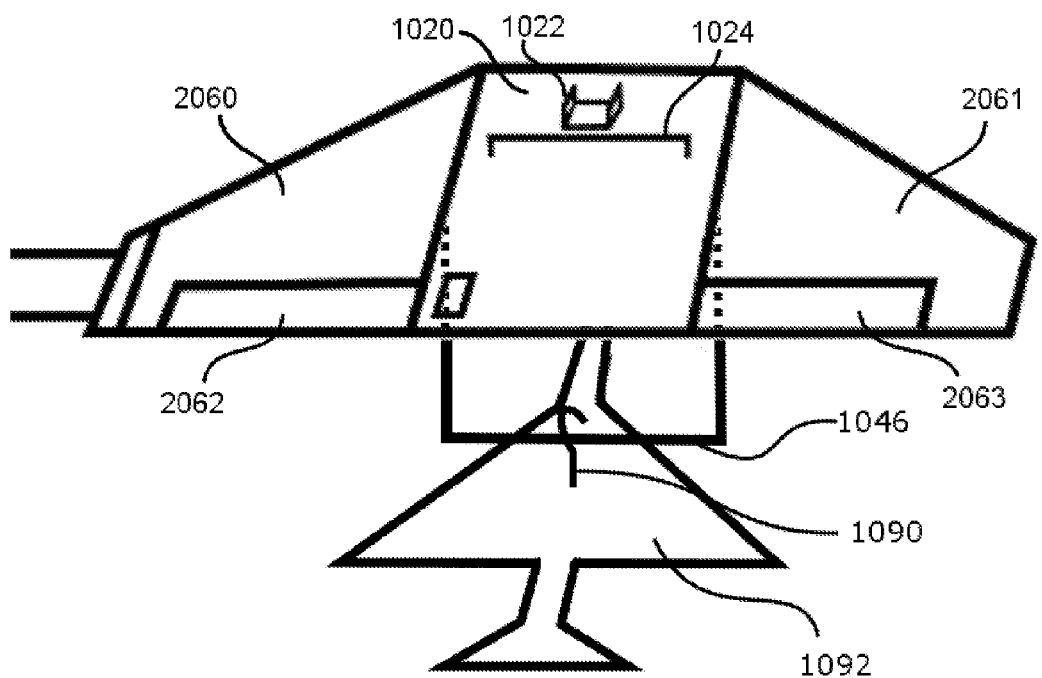
FIG. 2B is a perspective view of the preferred embodiment of the invention, showing the tilt pad and a hooked aircraft attached.
Figure 3:
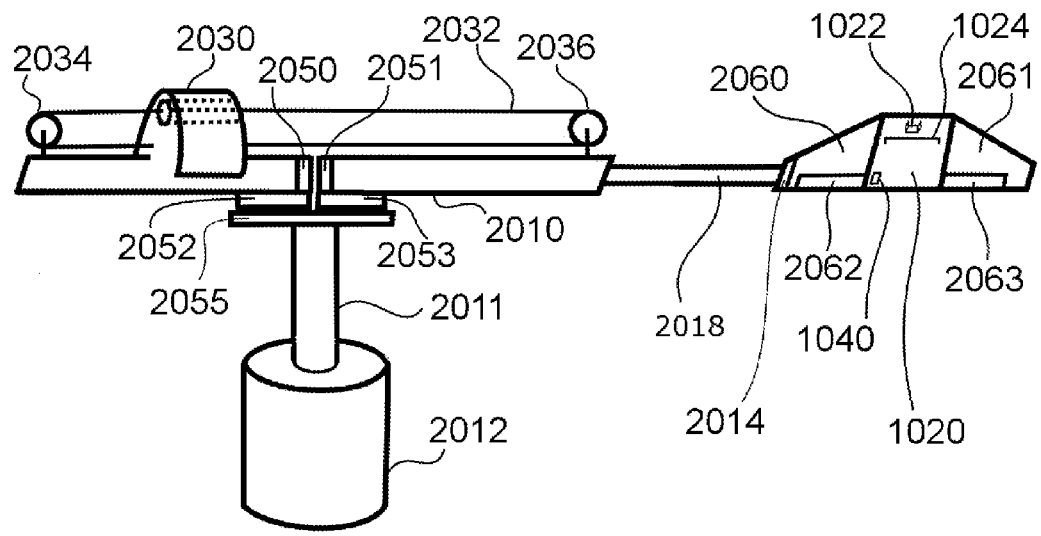
FIG. 3 is a perspective view of one embodiment of the invention, showing a first tilt pad connected to a pole.
Figure 4:
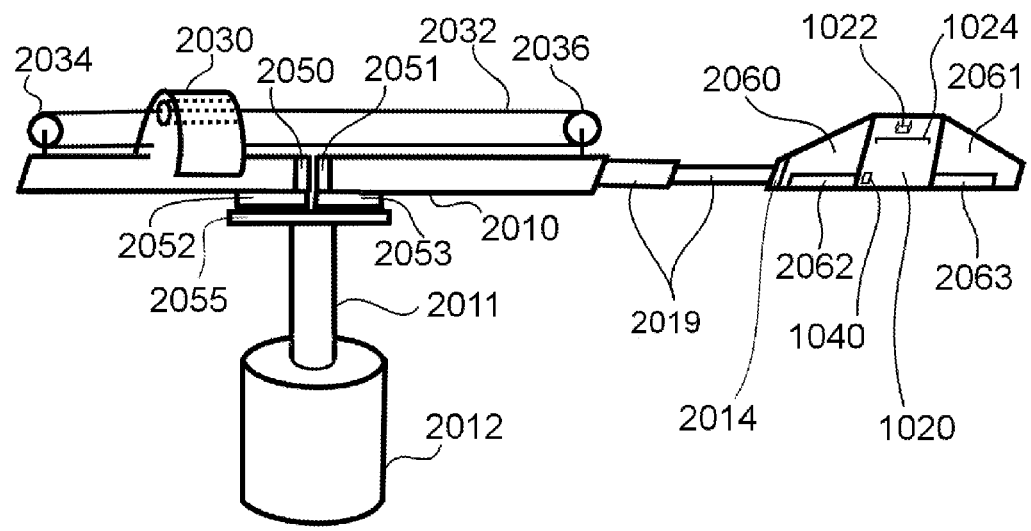
FIG. 4 is a perspective view of one embodiment of the invention, showing a first tilt pad connected to a telescoping pole mechanism.
Figure 5:
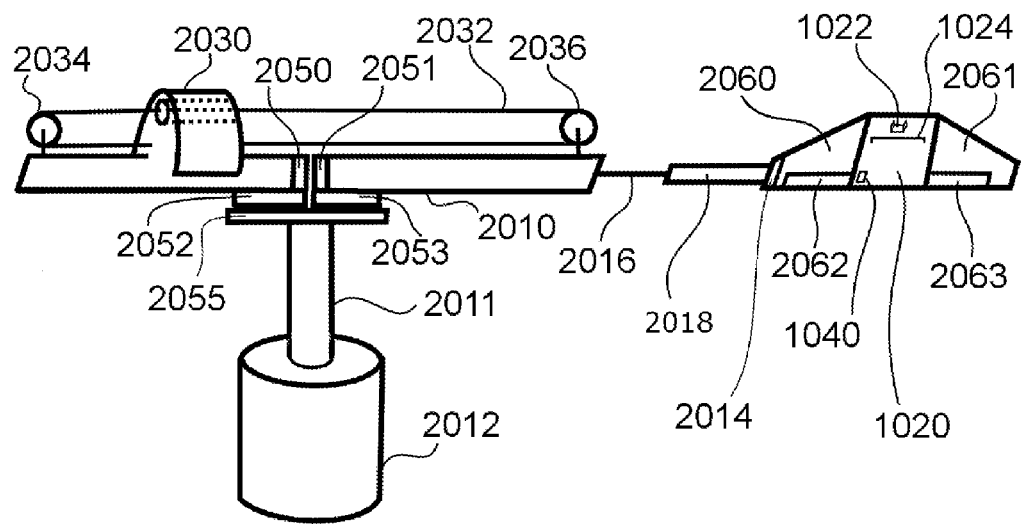
FIG. 5 is a perspective view of one embodiment of the invention, showing a first tilt pad connected to a soft cable with a pole.
Figure 6:
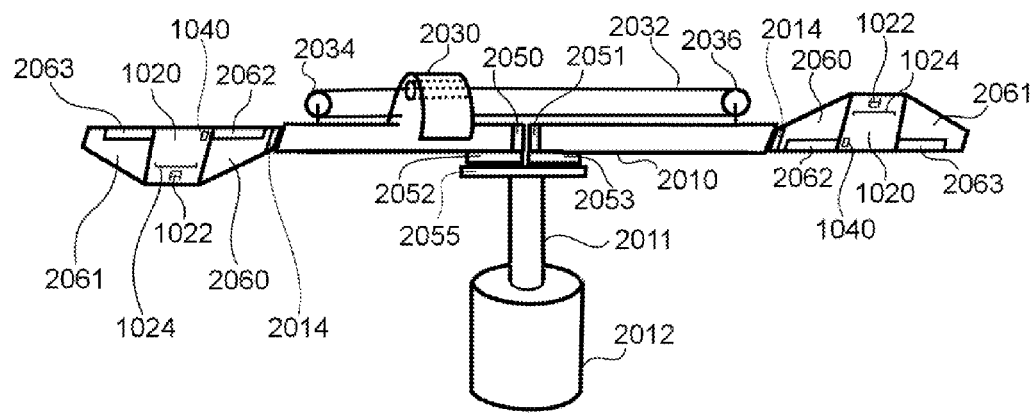
FIG. 6 is a perspective view of one embodiment of the invention, showing a first tilt pad connected to a rotating arm.
Figure 7:
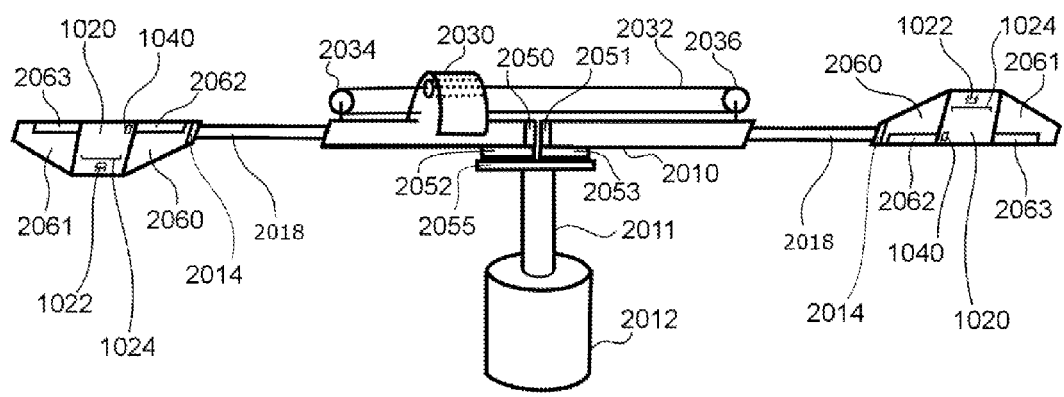
FIG. 7 is a perspective view of one embodiment of the invention, showing a first and a second tilt pad each connected to a pole.
Figure 8:
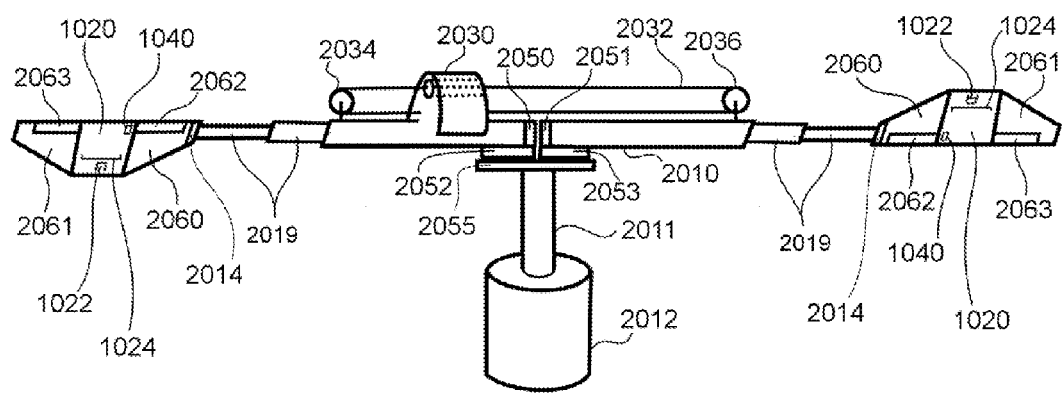
FIG. 8 is a perspective view of the preferred embodiment of the invention, showing a first and a second tilt pad each connected to a telescoping pole mechanism.
Figure 9:
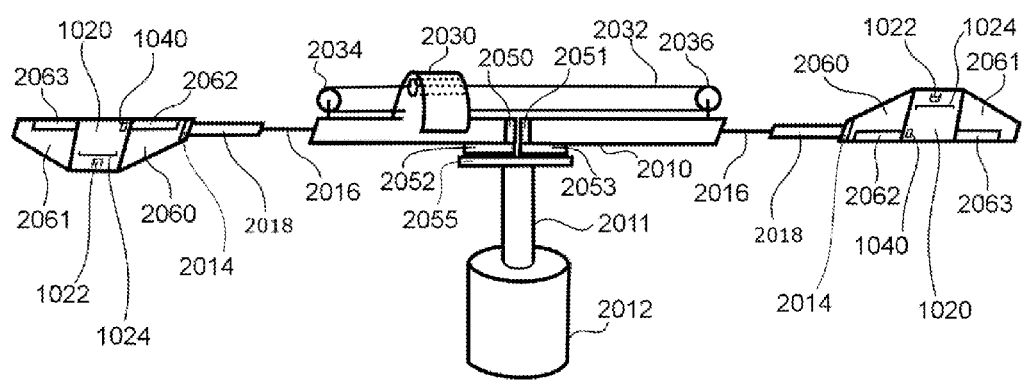
FIG. 9 is a perspective view of one embodiment of the invention, showing a first and a second tilt pad each connected to a soft cable with a pole.

FIGS. 1-9 showing the various embodiments of the invention. FIG. 1 is a perspective view of one embodiment of the invention, showing a first tilt pad connected to a rotating arm. FIG. 2A is a perspective view of the preferred embodiment of the invention, showing the tilt pad and an aircraft attached. FIG. 2B is a perspective view of an embodiment of the invention, showing the tilt pad and a hooked aircraft attached. FIG. 3 is a perspective view of one embodiment of the invention, showing a first tilt pad connected to a pole. FIG. 4 is a perspective view of one embodiment of the invention, showing a first tilt pad connected to a telescoping pole mechanism. FIG. 5 is a perspective view of one embodiment of the invention, showing a first tilt pad connected to a soft cable with a pole. FIG. 6 is a perspective view of one embodiment of the invention, showing a first and a second tilt pad each connected to a rotating arm. FIG. 7 is a perspective view of one embodiment of the invention, showing a first and a second tilt pad each connected to a pole. FIG. 8 is a perspective view of the preferred embodiment of the invention, showing a first and a second tilt pad each connected to a telescoping pole mechanism. FIG. 9 is a perspective view of one embodiment of the invention, showing a first and a second tilt pad each connected to a soft cable with a pole.

In an embodiment of the invention it is comprised of: A system to launch, carry and recover aerial vehicles, comprising:

a tilt pad 1020 with one or more arresting cables 1024 to catch a landing aerial vehicle 1092 and one or more grippers 1022 to hold and release and launch said aerial vehicle 1092;

said tilting pad 1020 has a tilting mechanism 2014 in order to match attitude of said aerial vehicle 1092 in circling motion;

said tilting pad 1020 is connected to a rotating arm 2010;

to achieve a larger rotational radius, a pole 2018, a telescoping pole 2019, or a soft cable 2016 with a pole 2018 is connected between said first tilting pad 1020 and said rotating arm 2010;

said tilting mechanism 2014 directly attaches to said rotating arm 2010, or either a pole 2018, a telescoping pole 2019, or a soft cable 2016 with a pole 2018, if they are used to expand the rotational radius;

a guide wheel 2036 is attached to said rotating arm 2010, so that a driving and position sensing unit 2034 can detect position of a counterweight 2030, and drive said counterweight to desired position between a first and a second end of said rotating arm 2010;

a base 2012, which contains a motor, an electronic control system, and a battery;

said motor is used to drive a rotation axis 2011 and said rotating arm 2010;

in order to detect imbalance, a horizontal force (or pressure) sensor 2050, 2051, a vertical force (or pressure) sensor 2052, 2053 and a mounting disk 2055 are added;

when said rotating arm 2010 is not rotating, static balancing is achieved by detecting imbalance via force sensors and driving counterweight 2030 to appropriate location on the rotating arm 2010 accordingly using driving and position sensing unit 2034 under the control of electronic control system inside base 2012;

in order to reduce imbalance dynamically when launching or landing only one aerial vehicle, counterweight 2030 driven by driving and position sensing unit 2034, chain (or belt) 2032 and guide wheel 2036 is attached to rotating arm 2010, so that driving and position sensing unit 2034 can detect position of the counterweight, and drive the counterweight to desired position between said ends of rotating arm 2010; and when said rotating arm 2010 is rotating, dynamic balancing is achieved by detecting imbalance via force sensors and driving counterweight 2030 to appropriate location on the rotating arm 2010 using driving and position sensing unit 2034, and adjusting deflection of flaperon 2062 and 2063 accordingly under the control of electronic control system inside base 2012.

In the preferred embodiment of the invention it is comprised of: A system to launch, carry and recover aerial vehicles, comprising:

a first tilt pad 1020 with one or more arresting cables 1024 to catch a landing aerial vehicle 1092 and one or more grippers 1022 to hold and release and launch said aerial vehicle 1092;

said first tilting pad 1020 has a tilting mechanism 2014 in order to match attitude of said aerial vehicle 1092 in circling motion;

said first tilting pad 1020 is connected to a rotating arm 2010;

to achieve a larger rotational radius, a pole 2018, a telescoping pole 2019, or a soft cable 2016 with a pole 2018 is connected between said first tilting pad 1020 and said rotating arm 2010;

said tilting mechanism 2014 directly attaches to said rotating arm 2010, or either a pole 2018, a telescoping pole 2019, or a soft cable 2016 with a pole 2018, if they are used to expand the rotational radius;

a guide wheel 2036 is attached to said rotating arm 2010, so that a driving and position sensing unit 2034 can detect position of a counterweight 2030, and drive said counterweight 2030 to desired position between a first and a second end of said rotating arm 2010;

a base 2012, which contains a motor, an electronic control system, and a battery;

said motor is used to drive said rotation axis 2011 and said rotating arm 2010;

in order to detect imbalance, a horizontal force (or pressure) sensor 2050, 2051, a vertical force (or pressure) sensor 2052, 2053 and a mounting disk 2055 are added;

when said rotating arm 2010 is not rotating, static balancing is achieved by detecting imbalance via force sensors and driving counterweight 2030 to appropriate location on the rotating arm 2010 accordingly using driving and position sensing unit 2034 under the control of electronic control system inside base 2012;

in order to reduce imbalance dynamically when launching or landing only one aerial vehicle, counterweight 2030 driven by driving and position sensing unit 2034, a pulley system chain (or belt) 2032 and guide wheel 2036 is attached to rotating arm 2010, so that driving and position sensing unit 2034 can detect position of the counterweight, and drive the counterweight to desired position between said ends of rotating arm 2010; and when said rotating arm 2010 is rotating, dynamic balancing is achieved by detecting imbalance via force sensors and driving counterweight 2030 to appropriate location on the rotating arm 2010 using driving and position sensing unit 2034, and adjusting deflection of flaperon 2062 and 2063 accordingly under the control of electronic control system inside base 2012.

The device as set forth above, further comprising a second tilt pad 1020 with one or more arresting cables 1024 to catch a landing aerial vehicle 1092 and one or more grippers 1022 to hold and release and launch said aerial vehicle 1092;

said second tilting pad 1020 has a tilting mechanism 2014 in order to match attitude of said aerial vehicle 1092 in circling motion;

said second tilting pad 1020 is connected to a rotating arm 2010; and to achieve a larger rotational radius, a pole 2018, a telescoping pole 2019, or a soft cable 2016 with a pole 2018 is connected between said second tilting pad 1020 and said rotating arm 2010.

The tilting mechanism 2014 directly attaches to one end of said rotating arm 2010. Wherein said tilting pad 1020 is connected to a rotating arm 2010 by a pole 2018 and wherein said tilting mechanism 2014 is attached directly to said pole. In another alternative embodiment, wherein said tilting pad 1020 is connected to a rotating arm 2010 by a telescoping pole mechanism 2019 to extend the rotational radius and wherein said tilting mechanism 2014 is attached directly to said telescoping pole mechanism 2019. In yet another alternative embodiment, wherein said tilting pad 1020 is connected to a rotating arm 2010 by a soft cable 2016 with a pole 2018 to achieve an even larger rotational radius and wherein said tilting mechanism 2014 is attached directly to said soft cable 2016 with a pole 2018.

In one embodiment, wherein said pulley system is a chain 2032. In an alternative embodiment, wherein said pulley system is a belt 2032.

The gripper 1022 on the tilt pad 1020 can hold and release wheel of an aircraft 1092. Arresting cable 1024 attached to the tilt pad 1020 is used to catch landing gear of said aircraft 1092 during landing.

In the various embodiments of this invention as illustrated in FIGS. 1-7, the following features should be noted:

1. Rotating arm 2010, rotation axis 2011 and base 2012, which contains a motor to drive rotating arm 2010, electronic control system, battery, etc. Imaginative tracks to support pad 1020 are dynamically formed or synthesized via the rotation of arm 2010.
2. Inside wing 2060 with inside flaperon 2062 and outside wing 2061 with outside flaperon 2063 are attached to pad 1020.
3. Tilting mechanism 2014 is added to tilt pad 1020 in order to match attitude of airplane in circling motion. Usually when an aircraft is circling, it tilts toward center of the circle. Tilting mechanism 2014 only tilts in the direction of making outside wing going upward, and prevents the pad and wings from going downwards.
4. In order to reduce imbalance dynamically, symmetrical "flying carpet" assemblies consisting of pad 1020 and wings are attached to both end of rotating arm 2010 with rotation axis passing through middle point of rotating arm 2010. With the symmetrical "flying carpet" assemblies, it's possible to launch and land 2 aircrafts at the same time.
5. In order to reduce imbalance dynamically when launching or landing only one aircraft, counterweight 2030 driven by driving and position sensing unit 2034, chain (or belt) 2032 and guide wheel 2036 is attached to rotating arm 2010 so that driving and position sensing unit 2034 can detect position of the counterweight, and drive the counterweight to desired position between 2 ends of rotating arm 2010.
6. In order to detect imbalance, horizontal force (or pressure) sensor 2050, 2051, vertical force (or pressure) sensor 2052, 2053 and mounting disk 2055 are added. Difference between forces sensed by sensor 2050 and 2051 determines horizontal imbalance due to centrifugal force. Difference between forces sensed by sensor 2052 and 2053 determines vertical imbalance due to weight and wing lift.
7. Optional telescoping mechanism 2018 can be added to extend rotation radius. Enlarging radius will reduce curvature, which equals to the reciprocal of radius of circular curve, therefore make aircraft landing easier since reducing curvature makes the landing curve closer to straight line, whose curvature is 0. When optional telescoping mechanism 2018 does not exist, tilting mechanism 2014 directly attaches to one end of rotating arm 2010.

8. Optional soft cable 2016 shown can be added to achieve even larger rotation radius. It's easier to extend much further using soft cable than using a rigid pole or telescoping pole.

When desired, one or more additional set of rotating arm 2010, "flying carpet" assemblies, dynamic balancing mechanism and optional radius extension mechanism can be attached to the same rotation axis.

When arm 2010 is not rotating, static balancing is achieved by detecting imbalance via force sensors and driving counterweight 2030 to appropriate location on the rotating arm 2010 accordingly using driving and position sensing unit 2034 under the control of electronic control system inside base 2012. For example, before launching 2 identical aircrafts simultaneously, counterweight 2030 should be placed at middle of rotating arm 2010, and before launching only one aircraft, counterweight 2030 should be placed at opposite side of the aircraft. Weight of base 2012 and forces which tie base 2012 to a supporting structure (e.g., ground) also help in balancing.

When arm 2010 is rotating, dynamic balancing is achieved by detecting imbalance via force sensors, driving counterweight 2030 to appropriate location on the rotating arm 2010 using driving and position sensing unit 2034, and adjusting deflection of flaperon 2062 and 2063 accordingly under the control of electronic control system inside base 2012.

For example, when launching only one aircraft, during acceleration, wing 2060 and 2061 attached to pad 1020 carrying the aircraft generate positive (upward) lift by deflecting corresponding flaperon 2062 and 2063 downward, and at the same time wing 2060 and 2061 attached to pad 1020 not carrying the aircraft generate negative (downward) lift by deflecting corresponding flaperon 2062 and 2063 upward. While speed becomes faster and faster, more lift are generated by wings of the aircraft and wings attached to pad 1020 so that counterweight 2030 can be shifted towards rotation center. While wings of the aircraft generate lift equals to or larger than its weight, the aircraft is released and fly off pad 1020. Since during acceleration, counterweight 2030 is already moved closer to center of rotation, this makes it easier to quickly move counterweight 2030 to the rotation center while deflections of all flaperons are controlled to maintain balance, and rotation speed of arm 2010 is gradually reduced.

When only one aircraft is landing, steps to achieve dynamic balance is about the reverse of the above steps to achieve dynamic balance while launching only one aircraft.

For the case that optional telescoping mechanism 2018 exists, when loading only one aircraft for launching while arm 2010 is not rotating, the preferred position is retracted position. The retracted position allows using lighter counterweight while maintaining static balance. Only when speed becomes fast enough so that wings generate sufficient upward or downward forces, telescoping pole mechanism 2019 starts to extend rotation radius. When an aircraft is approaching for landing, telescoping pole mechanism 2019 is extended to have larger radius and less curvature so that it's easier for the approaching aircraft to land. After the aircraft lands, telescoping pole mechanism 2019 retracts while rotation speed is reducing.

For the case that optional soft cable 2016 exists, during aircraft launching, due to its non-rigid nature, soft cable 2016 is only deployed when speed of pad 1020 carrying an aircraft is fast enough so that lift generated by wings attached to pad 1020 and wings of the aircraft is able to support weight of the above mentioned "flying carpet" assemblies and the aircraft. During aircraft landing, soft cable 2016 works in similar way as telescoping pole mechanism 2019 does.

Operation—During Passive Tilt Pad

During takeoff, tilt pad 1020 carrying an aircraft is driven forward by the aerial vehicle 1092. Arresting cable 1024 is lowered down. The pad accelerates forward in a circular rotation. When reaching certain speed, gripper 1022 release holding of wheel of the aerial vehicle 1092, and the aerial vehicle 1092 leaves the pad and climbs up.

During landing with passive pad, arresting cable 1024 is raised up; aircraft approaches the pad and after it's caught by arresting cable 1024, it powers off and slows down. Optionally tilt pad 1020 can be moved manually to follow approaching aircraft before the aircraft touches down on pad 1020.

Operation—During Active Tilt Pad

Alternatively showing the invention with an active pad. The structure is the same, except a sensing and control module 1040 is added to transform tilt pad 1020 from passive one to active one.

Tilt pad 1020 can be rotated back and forth by a motor 2012 while sensing and control module 1040 senses relative position between the tilt pad 1020 and an approaching aircraft 1092, and controls motor 2012 to drive the tilt pad according to sensed relative position.

Sensing and control module 1040 may be implemented using computer vision, radar, differential GPS or other means. Here differential GPS means a technology to determine relative position between 2 objects by calculating difference between GPS (Global Positioning System) coordinates of these 2 objects.

Operation

During takeoff, tilt pad 1020 carrying an aircraft is driven forward either by the aircraft or by motor 2012 or by both.

During landing when an aircraft approaches the tilt pad, sensing and control module 1040 senses the relative position and speed of the aircraft, and controls motor 2030 to drive the pad to move back or forth accordingly. After the aircraft is caught by arresting cable 1024, the aircraft powers off, and module 1040 controls the pad to slow down.

While the description above refers to a particular embodiment of the present invention, it will be understood that many modifications may be made without departing from the spirit thereof. The presently disclosed embodiments are therefore to be considered in all respects as illustrative and not restrictive.

What is claimed is:

1. A system to launch, carry and recover aerial vehicles, comprising:
   a first tilt pad with one or more arresting cables to catch a landing aerial vehicle and one or more grippers to hold and release and launch said aerial vehicle;
   said first tilting pad has a tilting mechanism in order to match attitude of said aerial vehicle in circling motion;
   said first tilting pad is connected to a rotating arm;
   a guide wheel is attached to said rotating arm, so that a driving and position sensing unit can detect position of a counterweight, and drive said counterweight to desired position between a first and a second end of said rotating arm;
   a base, which contains a motor, an electronic control system, and a battery;
   said motor is used to drive a rotation axis and said rotating arm;
   in order to detect imbalance, a horizontal force sensor, a vertical force sensor and a mounting disk are added;

when said rotating arm is not rotating, static balancing is achieved by detecting imbalance via force sensors and driving counterweight to appropriate location on the rotating arm accordingly using driving and position sensing unit under the control of electronic control system inside base;

in order to reduce imbalance dynamically when launching or landing only one aerial vehicle, counterweight driven by driving and position sensing unit, a pulley system and guide wheel is attached to rotating arm, so that driving and position sensing unit can detect position of the counterweight, and drive the counterweight to desired position between said ends of rotating arm; and when said rotating arm is rotating, dynamic balancing is achieved by detecting imbalance via force sensors and driving counterweight to appropriate location on the rotating arm using driving and position sensing unit, and adjusting deflection of flaperon and accordingly under the control of electronic control system inside base.

2. The device as set forth in claim 1, wherein said tilting mechanism directly attaches to one end of said rotating arm.

3. The device as set forth in claim 1, wherein to achieve a larger rotational radius, said first tilting pad is connected to said rotating arm by a pole and wherein said tilting mechanism is attached directly to said pole.

4. The device as set forth in claim 1, wherein to achieve a larger rotational radius, said first tilting pad is connected to said rotating arm by a telescoping pole mechanism to further extend the rotational radius and wherein said tilting mechanism is attached directly to said telescoping pole mechanism.

5. The device as set forth in claim 1, wherein to achieve a larger rotational radius, said first tilting pad is connected to said rotating arm by a soft cable with a pole to yet further extend the rotational radius and wherein said tilting mechanism is attached directly to said soft cable with said pole.

6. The device as set forth in claim 1, further comprising a second tilt pad with one or more arresting cables to catch a landing aerial vehicle and one or more grippers to hold and release and launch said aerial vehicle;

said second tilting pad has a tilting mechanism in order to match attitude of said aerial vehicle in circling motion; and said second tilting pad is connected to said rotating arm.

7. The device as set forth in claim 6, wherein to achieve a larger rotational radius, said second tilting pad is connected to said rotating arm by a pole and wherein said tilting mechanism is attached directly to said pole.

8. The device as set forth in claim 6, wherein to achieve a larger rotational radius, said second tilting pad is connected to said rotating arm by a telescoping pole mechanism to further extend the rotational radius and wherein said tilting mechanism is attached directly to said telescoping pole mechanism.

9. The device as set forth in claim 6, wherein to achieve a larger rotational radius, said second tilting pad is connected to said rotating arm by a soft cable with a pole to yet even further achieve an even larger rotational radius and wherein said tilting mechanism is attached directly to said soft cable with said pole.

10. The device as set forth in claim 1, wherein said pulley system is a chain.

11. The device as set forth in claim 1, wherein said pulley system is a belt.

12. A system to launch, carry and recover aerial vehicles, comprising:

one or more tilt pad with one or more arresting cables to catch a landing aerial vehicle and one or more grippers to hold and release and launch said aerial vehicle;

said tilting pad has a tilting mechanism in order to match attitude of said aerial vehicle in circling motion;

said tilting pad is connected to a rotating arm by a pole and wherein said tilting mechanism is attached directly to said pole;

a guide wheel is attached to said rotating arm, so that a driving and position sensing unit can detect position of a counterweight, and drive said counterweight to desired position between a first and a second end of said rotating arm;

a base, which contains a motor, an electronic control system, and a battery;

said motor is used to drive said rotation axis and said rotating arm;

in order to detect imbalance, a horizontal force sensor, a vertical force sensor and a mounting disk are added;

when said rotating arm is not rotating, static balancing is achieved by detecting imbalance via force sensors and driving counterweight to appropriate location on the rotating arm accordingly using driving and position sensing unit under the control of electronic control system inside base;

in order to reduce imbalance dynamically when launching or landing only one aerial vehicle, counterweight driven by driving and position sensing unit, a pulley system and guide wheel is attached to rotating arm, so that driving and position sensing unit can detect position of the counterweight, and drive the counterweight to desired position between said ends of rotating arm; and when said rotating arm is rotating, dynamic balancing is achieved by detecting imbalance via force sensors and driving counterweight to appropriate location on the rotating arm using driving and position sensing unit, and adjusting deflection of flaperon, accordingly under the control of electronic control system inside base.

13. The device as set forth in claim 12, wherein said pole is a telescoping pole mechanism to extend the rotational radius and wherein said tilting mechanism is attached directly to said telescoping pole mechanism.

14. The device as set forth in claim 12, further comprising a second tilt pad with one or more arresting cables to catch a landing aerial vehicle and one or more grippers to hold and release and launch said aerial vehicle;

said second tilting pad has a tilting mechanism in order to match attitude of said aerial vehicle in circling motion; and said second tilting pad is connected to said rotating arm by said pole.

15. The device as set forth in claim 14, wherein said pole is a telescoping pole mechanism to extend the rotational radius and wherein said tilting mechanism is attached directly to said telescoping pole mechanism.

16. The device as set forth in claim 12, wherein said pulley system is a chain.

17. The device as set forth in claim 12, wherein said pulley system is a belt.

18. A system to launch, carry and recover aerial vehicles, comprising:

one or more tilt pad with one or more arresting cables to catch a landing aerial vehicle and one or more grippers to hold and release and launch said aerial vehicle;

said tilting pad has a tilting mechanism in order to match attitude of said aerial vehicle in circling motion;

to achieve a larger rotational radius, said tilting pad is connected to a rotating arm by a soft cable with a pole, and wherein said tilting mechanism is attached directly to said soft cable with said pole;

a guide wheel is attached to said rotating arm, so that a driving and position sensing unit can detect position of a counterweight, and drive said counterweight to desired position between a first and a second end of said rotating arm;

a base, which contains a motor, an electronic control system, and a battery;

said motor is used to drive said rotation axis and said rotating arm;

in order to detect imbalance, a horizontal force sensor, a vertical force sensor and a mounting disk are added;

when said rotating arm is not rotating, static balancing is achieved by detecting imbalance via force sensors and driving counterweight to appropriate location on the rotating arm accordingly using driving and position sensing unit under the control of electronic control system inside base;

in order to reduce imbalance dynamically when launching or landing only one aerial vehicle, a counterweight driven by driving and position sensing unit, a pulley system and a guide wheel is attached to rotating arm, so that driving and position sensing unit can detect position of the counterweight, and drive the counterweight to desired position between said ends of rotating arm; and when said rotating arm is rotating, dynamic balancing is achieved by detecting imbalance via force sensors and driving counterweight to appropriate location on the rotating arm using driving and position sensing unit, and adjusting deflection of flaperon and accordingly under the control of electronic control system inside base.

19. The device as set forth in claim 18, further comprising a second tilt pad with one or more arresting cables to catch a landing aerial vehicle and one or more grippers to hold and release and launch said aerial vehicle;

said second tilting pad has a tilting mechanism in order to match attitude of said aerial vehicle in circling motion; and said second tilting pad is connected to a rotating arm.

20. The device as set forth in claim 19, to achieve a larger rotational radius, said second tilting pad is connected to a rotating arm by said soft cable with said pole, and wherein said tilting mechanism is attached directly to said soft cable with said pole.

* * * * *